Figure 1:
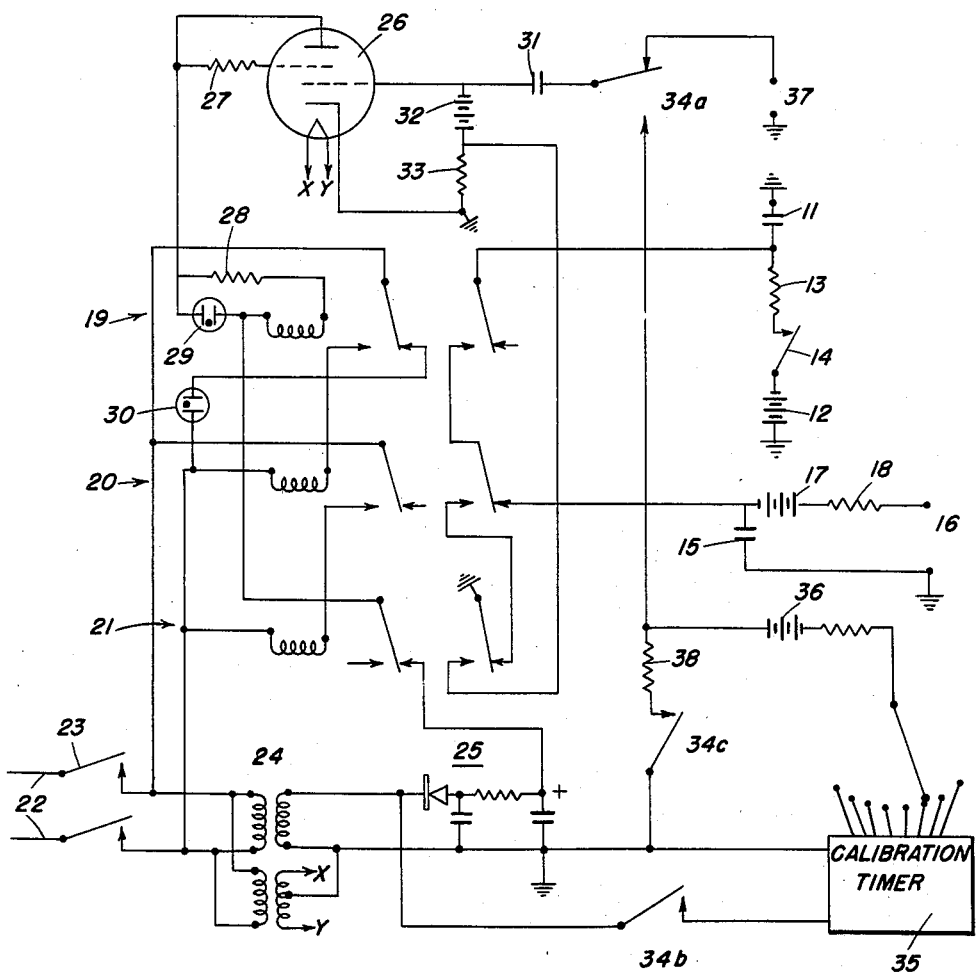

March 8, 1960

R. R. ROEPKE ET AL 2,927,573

RECORDING CARDIOTACHOMETER

Filed Nov. 30, 1955

INVENTOR.
RAYMOND ROLLIN ROEPKE
JOHN THOMAS LITCHFIELD, Jr.
BY

Samuel Branch Walker

ATTORNEY

United States Patent Office

2,927,573
Patented Mar. 8, 1960

2,927,573

RECORDING CARDIOTACHOMETER

Raymond Rollin Roepke, Old Greenwich, Conn., and John Thomas Litchfield, Jr., Ridgewood, N.J., assignors to American Cyanamid Company, New York, N.Y., a corporation of Maine Application November 30, 1955, Serial No. 550,020

5 Claims. (Cl. 128—2.05)

This invention relates to a recurring event rate recording instrument, more particularly to an instrument for recording the rate of a body function such as the heart beat rate or breathing rate or brain wave rate, or muscle and nerve potential rate in which the time interval between events is expressed substantially linearly as a rate for each individual event.

Rate recording is particularly important for the heart or breathing rates although the rates of other events is of importance and as data concerning such events becomes better known, a recording in an individual instance becomes of increasing value to diagnosticians and for experimentations. The heart rate is particularly important during operations and during treatment or to indicate physical condition. The heart rate has been used by diagnosticians for centuries and currently is usually measured as an integrated rate by counting the beats over a particular interval. Because the pulse rate is normally given as the number of beats per minutes, it is desirable that an instrument record in these terms so that the diagnostician has the information in the form to which he has become accustomed.

Instruments are in use which measure the integrated average heart beat rate. One such instrument is described as "An Electronic Cardiotachometer" by J. Warren Horton, Electronics, August 1938, pages 14–17 and 55.

In many conditions it is important to know the rate of each single beat and thus determine any arrhythmia and also minimize the effects of any false indications from the pick-up device or errors from transient events such as muscular spasms which might actuate an instrument and be falsely recorded as a heart beat.

Electrocardiographs give a measure of heart conditions but are inconvenient for measuring the heart beat rate. The electrocardiograph records electrical potential waves from its pick-ups and a sharp spike associated with the QRS complex of the electrocardiograph, conveniently the R wave, is used to actuate the present novel recording instrument. By using such wave peak from an electrocardiograph to operate the present instrument, the rate corresponding to each beat interval can be shown on a graph and thus used, by an observer.

A pulse pressure or other indication may be used to activate the present novel cardiotachometer, but more conveniently, electrocardiograph pick-ups are used. The electro-potentials from the electrocardiograph pick-up are amplified before being fed into the present cardiotachometer. The present cardiotachometer may be conveniently used in conjunction with an electrocardiograph during operations in which the pulse rate is plotted by the present device independent of other information given by the electrocardiograph.

In conventional resistance-capacitance circuits a charging potential is applied through a resistance to a condenser and the potential on the condenser is thus a function of time. The voltage E on the timing condenser increases with time of charging according to the relation.

(1) $$E = E_0 \left(1 - e^{-\frac{t}{RC}}\right)$$

in which $E_0$ is the charging potential in volts, $t$ is the time of charging in seconds, C is the capacitance of the timing condenser in farads and R is the resistance in ohms. If $t$ is the pulse interval, then E is the maximum potential on the timing condenser during the pulse interval. If $r$ is the pulse rate in beats per minute, then (2) $$t = \frac{60}{r}$$

and, from Equations 1 and 2

(3) $$E = E_0 \left(1 - e^{-\frac{60}{rRC}}\right)$$

Previously, cardiotachometers based on the use of a timing condenser involved values of R and C such that the potential E is less than 10% of $E_0$ with the longest pulse interval or lowest pulse rate to be measured. For practical purposes, E varies linearly with $t$ over this portion of the charging cycle. However, this linear relationship is of little practical value in a cardiotachometer, since the measurement is desired in terms of pulse rate rather than pulse interval. The relationship between E and $r$ is more nearly linear in the latter part of the charging cycle, with values of E up to approximately 95% of $E_0$.

A point of inflection on a plot of E against $r$ occurs where the second derivative of E with respect to $r$ is zero, and hence at this point of the curve the relationship between E and $r$ is most nearly linear. This occurs where the pulse rate is equal to 30/RC. When the potential on the timing condenser varies from approximately 60 to 95% of the charging potential, the resulting curve is sufficiently linear to be used for measurement of the rate. A device which will measure the maximum potential on the timing condenser over this portion of the range thus gives a measurement of the reciprocal of the time which is the desired rate.

Figure 1 shows a wiring diagram of a device constructed in accordance with our invention for measuring heart beat rates.

The cardiotachometer so constructed is simple in design, is easily assembled from readily available commercial components, is trouble-free for long periods of time, and may be built so as to be explosion-proof.

The essence of the rate measuring circuit is a timing condenser 11 which is charged by a battery 12 through a charging resistance 13. One side of the timing condenser and one side of the battery are grounded. A switch 14 may be included to disconnect the battery and extend its life. By a series of relays later described, the hot side of the timing condenser is grounded, so that the timing condenser is discharged, at the beginning of each time interval. At the end of the time interval the timing condenser is connected instantaneously to a measuring condenser 15 so that the potential on the timing condenser is transferred to the measuring condenser and thus the transferred potential on the measuring condenser gives an indication of the maximum potential reached by the timing condenser during the preceding cycle. The potential on the measuring condenser is measured directly by a high impedance recording voltmeter connected to the output terminals 16. Any conventional high impedance recording voltmeter of suitable range may be used. To reduce drift and increase sensitivity, it is convenient to include a bucking potential from a bucking battery 17 in series with a high output resistance 18 between the measuring condenser and the output terminals so that only the difference in potential applied to the measuring condenser and the bucking battery is measured, which further increases the sensitivity of the cardiotachometer.

For charging of the measuring condenser from the timing condenser, and the discharging of the timing condenser a series of three relays are used. A single complex relay could of course, be employed, but it is preferred to use three conventional double-pole double-throw relays. These relays are identified as the first relay 19, second relay 20 and third relay 21. The relay system is powered from an alternating current line 22 through a control switch 23 which controls the current supply to a transformer 24 and relays. The transformer is connected to a rectifying power supply 25 of conventional design. The plate lead from the direct current power supply passes through the normally closed contact of the first pole of the third relay and through the coil of the first relay to the plate of a thyratron tube 26. The second grid of the thyratron is connected through a resistor 27 to the plate supply. In series with the coil of the first relay 19 may be a current limiting resistor 28. Shunting the coil and the resistor is a neon bulb 29 which flashes when the relay coil is energized. The first pole of the first relay in the normally closed position applies potential to a second neon bulb 30 which glows except when the first relay is energized, and which shows that the instrument is in operating condition.

The normally open contact of the first pole is connected to one terminal of the coil of the second relay 20 and to one side of the A.C. line so that when the first coil is energized it closes the normally open contact and energizes the coil of the second relay. The first pole of the second relay when the relay is energized applies a potential to the coil of the third relay and causes the third relay to close. The first pole of the third relay in the normally closed position connects the power supply to the plate of thyratron tube; so that in operation when the thyratron tube fires there is closed in order the first relay which operates the second relay which operates the third relay and when the third relay closes, the plate supply to the thyratron tube is opened, thereby de-energizing the coil of the first relay which thus releases in order the second and third relays and thus re-sets the instrument. The input to the cardiotachometer from an electrocardiograph is connected through the input terminals 37 and the isolation condenser 31 to the control grid of the thyratron. A separate bias battery 32 applies a negative potential to the control grid of the thyratron and has in series with it to ground a grid resistor 33. This grid resistor is short circuited through the second pole of the third relay in the closed position so that on re-set the condenser connected to the control grid of the thyratron tube is at its control value.

The filament of the thyratron is connected to the power transformer 24 in conventional fashion.

The second pole of the first relay is connected so that when the first relay is energized the timing condenser is instantaneously connected to the measuring condenser 15. The above described sequential closing of the second relay causes the second pole of the second relay to disconnect the measuring condenser from the timing condenser, thus leaving on the measuring condenser the desired potential, which is then retained by this condenser until the next pulse is fed into the cardiotachometer, and which potential is measured by the recording voltmeter. The closing of the normally open contact of the second pole of the second relay connects the timing condenser to ground through the normally closed contacts of the second pole of the third relay which discharges the timing condenser. Opening of the normally closed contacts of the second pole of the third relay disconnects the timing condenser from ground which initiates the next charge cycle on the timing condenser.

For calibration of the device, it is convenient to have a calibrating switch 34 which is a three pole double throw switch, the first pole of which, 34a, disconnects the input to the thyratron from the electrocardiograph and connects it to a calibrating timer 35. The second pole, 34b, connects a power supply to the calibrating timer. The third contact, 34c, connects the isolation condenser 31, to ground through a bleed resistor 38. This reduces the potential on the input side of the isolation condenser 31 between potential impulses from the calibrating timer. The calibrating timer may be any conventional device which causes contacts to close at a known calibrating frequency and is conveniently a series of microswitches which are caused to close by a synchronous motor so as to induce a pulsed potential at a known frequency on the thyratron grid. The details of this circuit are conventional and accordingly are not shown.

Obviously minor variations of the instrument may be incorporated without deviating from the scope of the present invention. The values of the relays and components are not critical except for the timing circuit and the values of the timing circuit must necessarily vary with the repetition rate which is to be measured. The timing condenser is at least ten times the value of the measuring condenser and the values are so chosen that, as described above, an essentially straight line portion of the potential rate curve is utilized. In use it is convenient to bracket the measured rate from the calibrating timer in order to insure that drift in battery potentials and other variables do not affect the accuracy of the instrument.

Other triggered circuits may be used instead of the particular thyratron circuit shown if desired.

We claim:

1. A cardiotachometer comprising a thyratron tube, means to activate the thyratron tube from the R wave of an electrocardiograph pick-up, three double-pole double-throw relays, means for connecting the coil of the first relay between the plate of said thyratron and a potential source, means connecting the coil of said second relay through the first pole of said first relay in a normally open relationship to a potential source, means connecting the coil of said third relay through the first pole of said second relay in a normally open relationship to a potential source and means connecting the first pole of said third relay in series with the coil of said first relay in normally closed condition, to break the current through said first relay coil, whereby when an R wave pulse causes the thyratron tube to fire, the three relays first close in numerical sequence and then open in numerical sequence; a charging potential source, a charging resistance and a timing condenser in series; a measuring condenser, means connecting the hot side of said timing condenser through the second pole of said first relay when the normally open contacts are closed, through the second pole of the second relay in normally closed relationship to said measuring condenser, means connecting the normally open contact of said second pole of said second relay through the normally closed second pole of said third relay to ground and means connecting the normally open contact of said second pole of said third relay to the grid of said thyratron whereby at one R wave pulse the hot side of the charged condenser is first connected to the measuring condenser and then grounded and then the grid of the thyratron is instantaneously grounded to re-set the thyratron for the next R wave pulse.

2. In a rate recorder for individual recurring events, a potential source, a charging resistance, and a timing condenser in series; a measuring condenser, means to discharge the timing condenser at the start of a time interval, means to connect the timing condenser to the measuring condenser instantaneously at the end of said time interval, and means to measure the potential thereby placed on said measuring condenser, the values of said charging resistance and timing condenser being such that the potential imparted to the measuring condenser over the effective rate range of the instrument is between 60% and 95% of that of said potential source, whereby the potential imparted to the measuring condenser is essentially linear with rate over the effective range of time intervals being measured.

3. In a rate recorder for individual recurring events, a potential source, a charging resistance, and a timing condenser in series; a measuring condenser, means to discharge the timing condenser at the start of a time interval, means to connect the timing condenser to the measuring condenser instantaneously at the end of said time interval, and means to measure the potential thereby placed on said measuring condenser, the values of said charging resistance and timing condenser being such that the value of $rRC$ is between about 65.5 and 20 over the effective range of the instrument where:

$r$ is the rate per minute of said events,
$R$ is the value of said charging resistance in ohms, and
$C$ is the value of said timing condenser in farads, whereby the potential imparted to the measuring condenser is essentially linear with rate over the range of time intervals being measured.

4. In a rate recorder for individual recurring events, a potential source, a charging resistance, and a timing condenser in series; a measuring condenser, means to discharge the timing condenser at the start of a time interval, means to connect the timing condenser to the measuring condenser instantaneously at the end of said time interval, a bucking battery and a resistance connected to said measuring condenser, and means to measure the potential placed on said measuring condenser less the potential of said bucking battery, the values of said charging resistance and timing condenser being such that the potential imparted to the measuring condenser over the effective rate range of the instrument is between 60% and 95% of that of said potential source, whereby the potential imparted to the measuring condenser is essentially linear with rate over the effective range of time intervals being measured.

5. In a rate recorder for individual recurring events, a potential source, a charging resistance, and a timing condenser in series; a measuring condenser, means to discharge the timing condenser at the start of a time interval, means to connect the timing condenser to the measuring condenser instantaneously at the end of said time interval, a bucking battery and a resistance connected to said measuring condenser, and means to measure the potential placed on said measuring condenser less the potential of said bucking battery, the values of said charging resistance and timing condenser being such that the value of $rRC$ is between about 65.5 and 20 over the effective range of the instrument where:

$r$ is the rate per minute of said events,
$R$ is the value of said charging resistance in ohms, and
$C$ is the value of said timing condenser in farads, whereby the potential imparted to the measuring condenser is essentially linear with rate over the effective range of time intervals being measured.

References Cited in the file of this patent

UNITED STATES PATENTS

| | | |
|---|---|---|
| 2,637,010 | Charske | Apr. 28, 1953 |
| 2,673,056 | Beard | Mar. 30, 1954 |
| 2,815,748 | Boucke | Dec. 10, 1957 |

FOREIGN PATENTS

| | | |
|---|---|---|
| 446,031 | Great Britain | Apr. 23, 1936 |